United States Patent [19]
Gilardi

[11] 3,951,002
[45] Apr. 20, 1976

[54] CONTROL DEVICE FOR ACTIVATING A CONTROL ELEMENT BY THE ALTERNATIVE ACTIVATION OF ONE OF TWO OPERATING ELEMENTS

[75] Inventor: Carlo Gilardi, Lugano, Switzerland
[73] Assignee: Anstalt Egra, Vaduz, Liechtenstein
[22] Filed: Aug. 2, 1974
[21] Appl. No.: 494,122

[30] Foreign Application Priority Data
Sept. 26, 1973 Switzerland.................... 13769/73

[52] U.S. Cl. ................................................. 74/29
[51] Int. Cl.² .......................................... F16H 19/04
[58] Field of Search ............... 74/29, 89.22, 21, 27, 74/409

[56] References Cited
UNITED STATES PATENTS

| | | |
|---|---|---|
| 433,396 | 7/1890 | Cox........................................ 74/29 |
| 2,502,057 | 3/1950 | Mitchell................................. 74/29 |
| 2,884,788 | 5/1959 | Clark..................................... 74/409 |
| 3,580,095 | 5/1971 | Seed ...................................... 74/409 |
| 3,850,043 | 11/1974 | Tarbox................................... 74/89.21 |

*Primary Examiner*—Benjamin W. Wyche
*Assistant Examiner*—Wesley S. Ratliff, Jr.
*Attorney, Agent, or Firm*—Ladas, Parry, Von Gehr, Goldsmith & Deschamps

[57] ABSTRACT

A control device which, as a result of the alternative movement of one of two operating elements, moves a control element connected to a member to be controlled by the device, is described. The device comprises a first and second saddle mobile axially on a frame, and between which is disposed a rolling body arranged to cooperate with a part of each of said saddles to rotate said body on said part of one saddle when the other saddle is moved axially, said control element being connected to the rotation axle of said rolling body so as to move axially with it.

3 Claims, 8 Drawing Figures

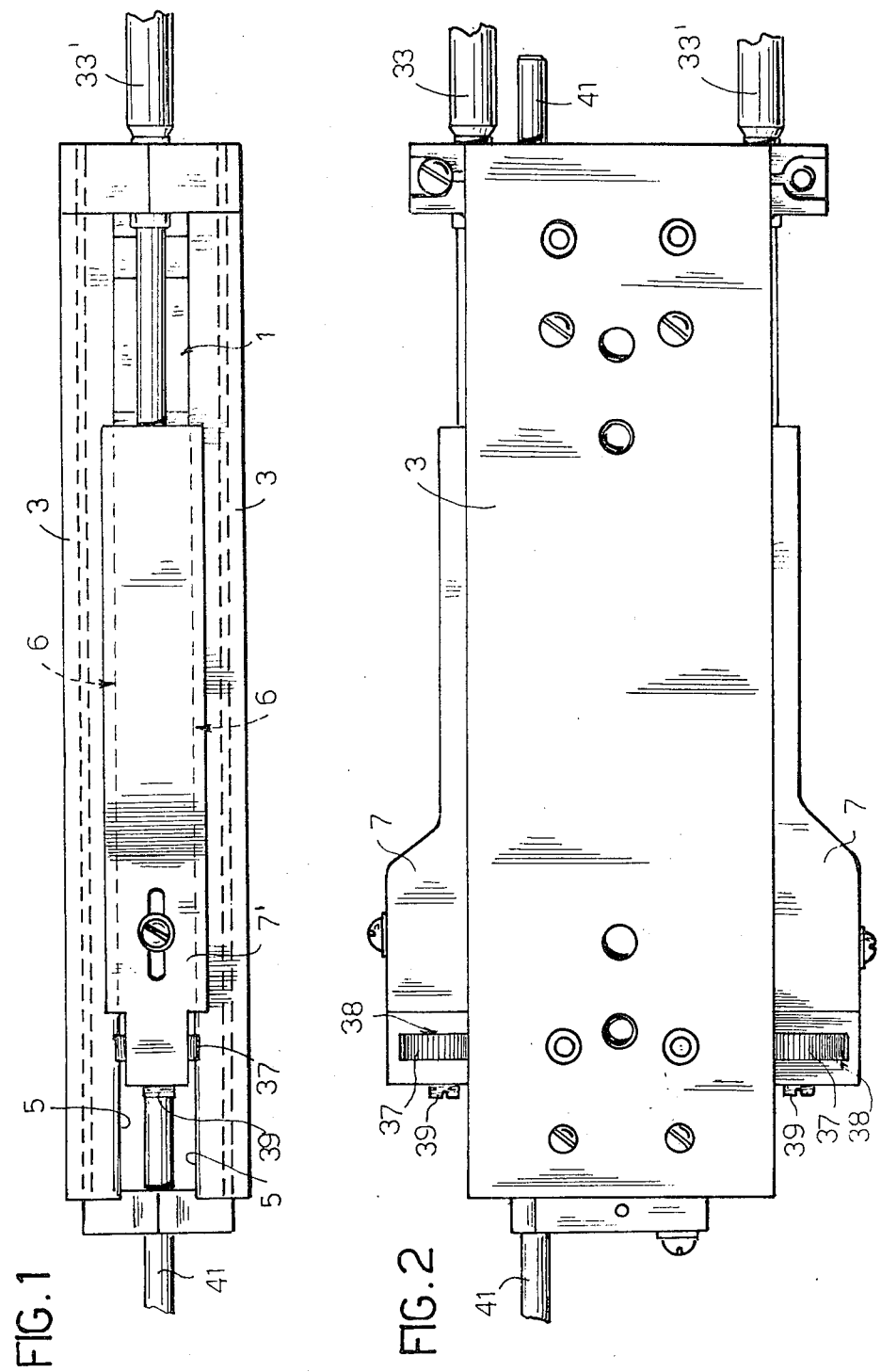

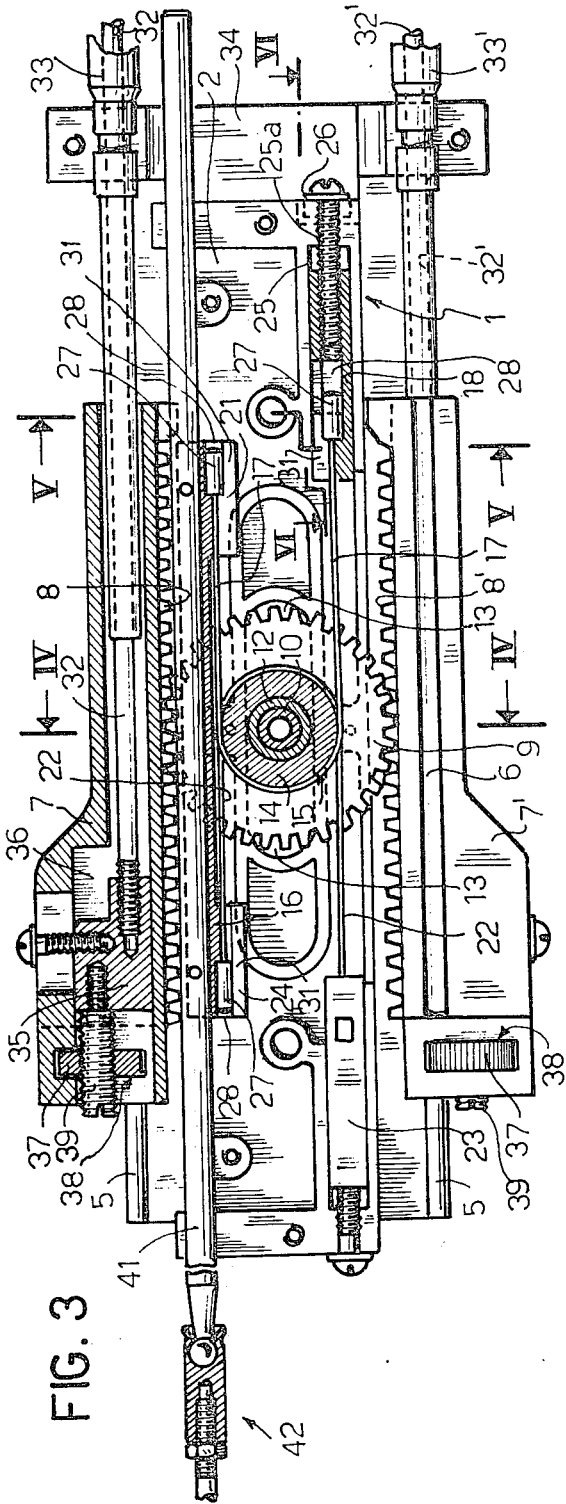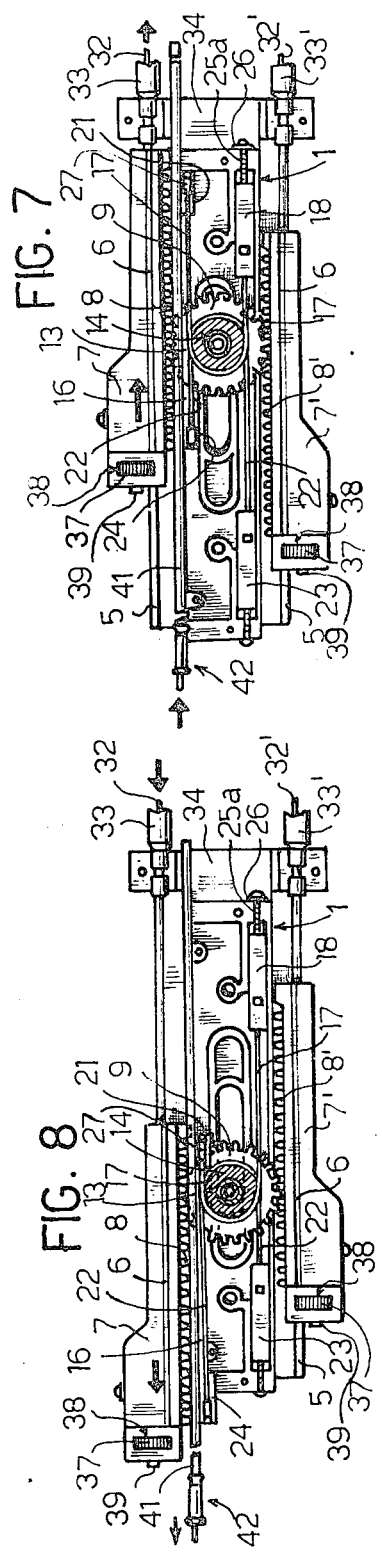

CONTROL DEVICE FOR ACTIVATING A CONTROL ELEMENT BY THE ALTERNATIVE ACTIVATION OF ONE OF TWO OPERATING ELEMENTS

CROSS REFERENCE TO RELATED APPLICATION

Applicant claims priority from corresponding Swiss patent application Ser. No. 13769/73 filed Sept. 26, 1973.

BACKGROUND OF THE INVENTION

This invention relates to a control device for activating a control element which operates another device or machine, as a consequence of the activation of one of two operating elements mounted in parallel and designed to alternatively control said device or machine.

In certain applications, a device or machine is controlled alternatively by one of two operating elements disposed at two different points. One application in which this requirement frequently occurs is that of boats, in which the accelerator and clutch of the boat engine are controlled by one of two operating elements which usually consist of flexible cables which slide within a sheath. This alternative control is obtained substantially by the use of one of two types of device, each of which is positioned between said operating elements and the device or machine which is to be controlled.

A device of a first type comprises substantially a linkage which contains a lever connected at two different points to said two operating elements, and connected at a third point to the device to be controlled, by way of a suitable transmission system.

Devices of this type have fairly low control response and precision, because of the slack between the various parts of the device. This disadvantage is particularly grave when the direction of movement of one of said operating elements is reversed.

A device of a second type, suitable for use when said operating elements consist of flexible cables slideable within a sheath, comprises a frame on which there is a slideable saddle connected both to the cable of one of said two operating elements and to the sheath of the other. The cable of this latter operating element is connected directly to the device to be controlled.

Devices of this second type have the disadvantage of requiring a fairly large force for their operation, because of friction. Furthermore, during activation of the device, the sheath of one of the operating elements moves, with the disadvantage of altering the initial configuration (position and curvature) of the elements themselves.

SUMMARY OF THE INVENTION

The object of the present invention is to provide a control device able, by the alternative movement of one of two operating elements, to move a control element connected to a member to be controlled by the device, by which the aforementioned disadvantages are eliminated.

The device according to the invention comprises a first and second saddle mobile axially on a frame, and between which is disposed a rolling body arranged to cooperate with a part of each of said saddles to rotate said body on said part of one saddle when the other saddle is moved axially, said control element being connected to the rotation axle of said rolling body so as to move axially with it.

BRIEF DESCRIPTION ON THE DRAWINGS

For a better understanding of the present invention, a description will be given of one particular embodiment by way of example, with reference to the accompanying drawings in which:

FIGS. 1 and 2 are partial plan and side views respectively of the device according to the invention;

FIG. 3 is a longitudinal section through the device according to the invention;

FIGS. 7 and 8 are diagrammatic side views of the device in two different working positions.

DETAILED DESCRIPTION OF THE INVENTION

Figure 4:
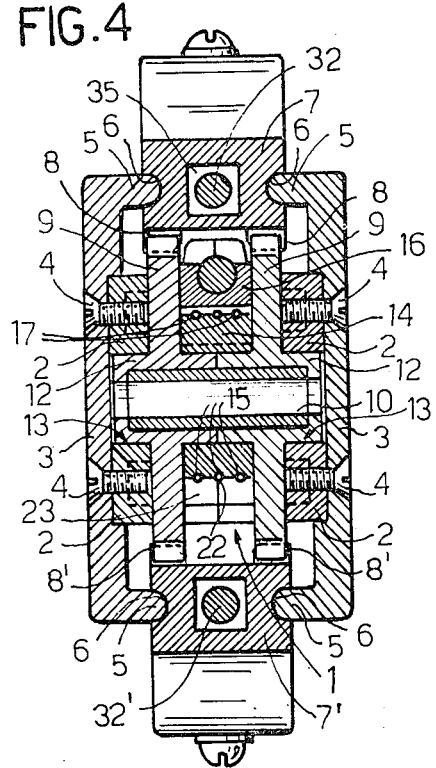
FIGS. 4, 5 and 6 are sections through the device of FIG. 3 on the lines IV—IV, V—V and VI—VI respectively.

In the embodiment shown, the device according to the invention comprises a frame, indicated overall by 1 (FIGS. 3 and 4) consisting substantially of cross members 2 joined together in any convenient manner, for example by screws (not shown). On the outer surface of each cross member 2 rests a plate 3 (FIG. 4) which is fixed to the relative cross member by screws 4 and which is provided with a pair of longitudinal projections 5, each of which is arranged to cooperate with a corresponding groove 6 formed in one of two saddles 7, 7', to enable these latter to slide longitudinally with respect to said plates. On that side of each saddle 7 and 7' which faces the cross members 2, there is a pair of racks, 8, 8' respectively, each of which is arranged to cooperate with the teeth of a corresponding gear wheel 9. These gear wheels are disposed between the saddles 7, 7' so as to engage simultaneously with the pairs of racks 8, 8' of both the saddles.

The two gear wheels 9 are rigidly fixed together, for example by a bush 10, inserted into a bore in the gear wheels. These gear wheels are provided with cylindrical hubs 12, the lateral ends of which are housed in corresponding elongated perforations 13 (FIGS. 3 and 4) formed in the cross members 2. Between the gear wheels 9 and on the central part of the relative hubs 12, there is a pulley 14 provided with three annular races 15 in the embodiment shown. A third saddle 16 is mounted on the frame 1 between the gear wheels 9 and is mobile axially with respect to the frame.

Figure 5:
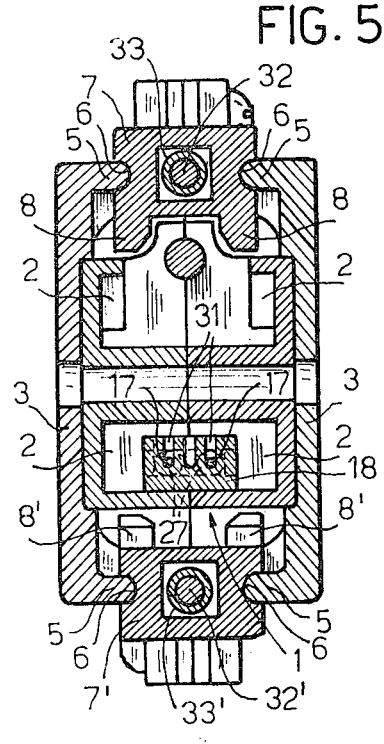
Figure 6:
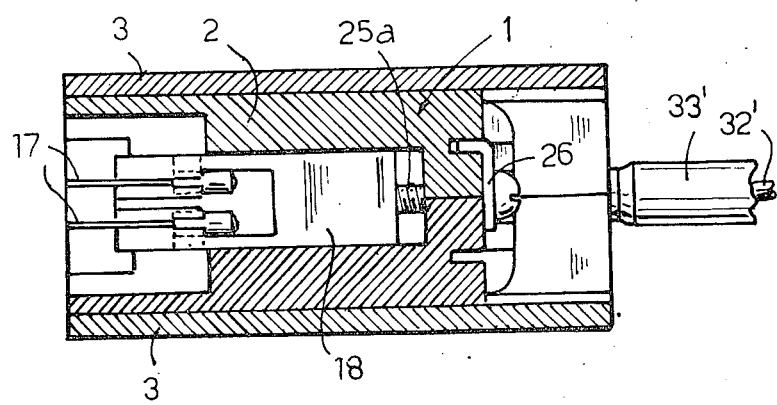

Two deformable elements 17 (FIGS. 3, 4 and 5), for example wires, metal cables, tapes or chains are housed in the two lateral races 15 of the pulley 14, and wind about them through an arc substantially equal to 180°, one end of each of them being fixed to a block 18 (FIG. 3) rigid with the frame 1 and the other end to one end 21 of the saddle 16.

Another deformable element 22 (FIGS. 3 and 4) winds, substantially through an arc of 180°, on the central race 15 of the pulley 14, one of its ends being fixed to a block 23 (FIG. 3), also rigid with the frame 1, and its other end to the other end 24 of the saddle 16. The positions of the blocks 18 and 23 and of the ends 21 and 24 of the saddle 16 are such that each of the deformable elements 17 and 22 has one pair of end portions substantially parallel, as is clearly shown in FIG. 3.

Conveniently, the position of each block 18 and 23 is adjustable axially with respect to the frame 1, so as to be able to exactly position the end of the cable fixed to it. For this purpose, the frame 1 may comprise two cavities 25 inside each of which each block is axially mobile, and an adjustment screw 25a which screws into a corresponding threaded perforation of the block and passes through a hole in the frame.

Each end of the deformable elements 17 and 22 may be provided with a cylindrical enlargement 27 housed in a corresponding cylindrical hole 28 formed in the block 18 or 23 or in the ends 21 and 24 of the saddle 16, each of these latter being provided with a slot 31 which allows the passage of the deformable element.

To each saddle 7, 7' is connected the end of a corresponding operating element, 32, 32' respectively, which in the case of the embodiment shown consists of a flexible cable provided with a covering sheath 33, 33' in which it can slide. Conveniently, the sheath 33, 33' is fixed by a collar 34 to the frame 1 of the device. It is however evident that instead of a flexible cable, any other operating element may be used, for example a rigid rod.

The end of each operating element 32, 32' (FIG. 3) is fixed, for example by a threaded coupling, to a corresponding block 35, slideable inside a corresponding cavity 36 in the relative saddle. The said block can be moved inside the relative cavity so as to position the end of the corresponding operating element, by means of a knurled wheel 37, housed in a corresponding slot 38 in the saddle and provided with a threaded hole coupled to a threaded rod 39 fixed to the block 34.

A control rod 41 is fixed to the saddle 16 and can be connected, for example by a ball joint 42, to that member of the device controlled by the device according to the invention.

The operation of the described device is as follows. It will be supposed that the device, which serves to control another device or a machine from two different points, is used for example to control the accelerator or clutch of a marine engine by means of two control devices of the single lever type, disposed in different areas of a boat. In this case each of the operating elements 32, 32' (FIG. 3) consists normally of a flexible cable provided with a sheath and operated by the said single lever devices. The cables 32, 32' are connected, in the manner indicated in FIG. 3, to the relative saddles 7 and 7', the sheathes 33 and 33' are connected to the collar 34 and the rod 41 is fixed to the linkage arranged to control, for example, the engine accelerator.

It will be now supposed that the first of the two single lever devices to be operated is that which has the cable 32 connected to the saddle 7, and that by its operation the cable is moved towards the right in FIG. 3, so as to form the configuration shown in FIG. 7. It follows that as the saddle 7 moves in the same direction, the engagement between the racks 8 and 8' and the corresponding gear wheels 9 causes these gear wheels to rotate such that they roll on the racks 8', the gear wheels thus moving towards the right as clearly shown in FIG. 7.

During this rotation of the gear wheels 9, as one end of the deformable element 22 is fixed (FIG. 3) to the frame 1 by the block 23, the central race 15 of the pulley 14 rolls on this deformable element so causing the other end of the element to move towards the right, for a distance substantially double the axial movement of the gear wheels. The saddle 16 thus moves in the same direction, as does the rod 41 which can operate, for example, the engine accelerator. During this movement those ends of the deformable elements 17 connected to the end 24 of the saddle 16 also move, with the result that the element is kept constantly wound in the relative races 15 of the pulley 14. On termination of the first mentioned movement, the parts of the device assume the position shown in FIG. 7.

If it is now supposed that the direction of movement of the operating element 32 is reversed (FIG. 8), it is evident that the rod 41 moves to the left, in an identical manner to that described; in this case the saddle 16 is dragged by the deformable element 22 instead of 17 as in the previous case.

If it is now supposed that the other of the two single lever control devices is operated so as to move the saddle 7', for example, towards the right, the gear wheels 9 will roll on the racks 8 causing the gear wheels to move linearly in the same direction. The saddle 16 will again move axially towards the right, controlled by the deformable elements 17, in a manner identical to that previously described with reference to the movement of the saddle 7. It is also evident that a movement towards the left of the saddle 7' gives rise, in the manner previously described, to a movement in the same direction of the saddle 16, controlled by the deformable element 22.

With the described structure, a predetermined movement of one of the two saddles 7, 7' in one of the two directions gives rise to a corresponding movement in the same direction of the axis of the gear wheels 9 equal to one half of the previous movement, and thus a movement of the saddle 16 equal to the initial movement. Consequently, with the device according to the invention, it is possible by moving one of the operating elements 32, 32', to make the control rod 41 move in the same direction and by the same amount, while the other operating element remains fixed.

From the description it is evident that the force necessary for moving the control rod 41 as a consequence of the movement of one of the operating elements 32, 32', is very small because of the low friction during the relative movement of the parts of the device according to the invention.

In this respect, during operation of the device there is substantially a rolling movement of the gear wheels 9 on the racks 8 and 8', and a simultaneous bending of the flexible elements 17 and 22. Thus, contrary to previous known devices, the device according to the invention requires a very small force for its operation.

Furthermore, because of the constructional arrangement of the device, the movement of the control rod 41 is always rigorously equal, at any moment, to the movements of each of the operating elements 32, 32'. Finally, because of the absence of slack between the various coupled parts of the device, when the direction of movement of either of the elements 32, 32' is reversed, there is an immediate movement of the control rod 41 without the need to take up the slack, as happens with previously known devices.

By axially moving each block 35 with respect to the corresponding saddle 7, 7' by rotating the knurled wheels 38, it is possible to adjust the phasing of each operating element 32, 32' with respect to the other, while by moving the blocks 18 and 23 by rotating the screws 25a, the tension of the deformable elements 17 and 22 can be adjusted so as to ensure that there is no slack between the parts of the device.

What we claim is:

1. A control device which, as a result of the alternative movement of one of two operating elements, moves a control element connected to a member to be controlled by the device, comprising:
   a frame;
   first and second saddles movable axially on said frame and each formed with a rack;
   a gear member disposed between said saddles and having first and second discs each formed with a ring gear arranged to cooperate with the rack of each of said saddles to rotate said gear member on the rack of one saddle when the other saddle is moved axially, and the gear member also having a cylindrical part disposed between said first and second discs;
   a third saddle movable axially on said frame and having the control element fixed thereto, and being disposed between said first and second discs; and
   first and second deformable elements each wound at least partially around said cylindrical part and having one end rigid with said frame and its other end rigid with said third saddle, the arc through which each of said elements is wound being substantially 180° and the two ends of said first element being on the opposite side of said gear member with respect to the two ends of said second element.

2. A device as claimed in claim 1, comprising a third deformable element wound at least partially around said cylindrical part and having one end rigid with said frame and its other end rigid with said third saddle, the arc through which the third element is wound being substantially 180° and the two ends of said third element being on the same side of said gear member as the two ends of said first element, the second deformable element being wound around said cylindrical part at a location between those at which the first and third elements are wound around said cylindrical part.

3. A device as claimed in claim 1, in which said member comprises two cross members which are joined together and between which is disposed said gear member, and in which a plate is fixed to each of said cross members and is provided with guides for said first and second saddles.

* * * * *